United States Patent
Rider et al.

(10) Patent No.: US 8,929,736 B2
(45) Date of Patent: Jan. 6, 2015

(54) REGENERATORS PLACEMENT MECHANISM FOR WAVELENGTH SWITCHED OPTICAL NETWORKS

(71) Applicant: Alcatel Lucent USA, Inc., Murray Hill, NJ (US)

(72) Inventors: Douglas Clayton Rider, Ottawa (CA); James Craig Slezak, Ottawa (CA); Anthony Vernon Walker Smith, Ottawa (CA)

(73) Assignee: Alcatel Lucent, Boulogne-Biliancourt (FR)

( * ) Notice: Subject to any disclaimer, the term of this patent is extended or adjusted under 35 U.S.C. 154(b) by 0 days.

(21) Appl. No.: 14/034,876

(22) Filed: Sep. 24, 2013

(65) Prior Publication Data

US 2014/0086570 A1 Mar. 27, 2014

Related U.S. Application Data

(63) Continuation of application No. 10/097,901, filed on Mar. 13, 2002, now Pat. No. 8,571,415, which is a continuation-in-part of application No. 09/909,265, filed on Jul. 19, 2001, now Pat. No. 7,171,124.

(51) Int. Cl.
*H04J 14/02* (2006.01)
*H04Q 11/00* (2006.01)

(52) U.S. Cl.
CPC ........ *H04Q 11/0005* (2013.01); *H04J 14/0246* (2013.01); *H04J 14/0257* (2013.01); *H04J 14/0283* (2013.01); *H04J 14/0269* (2013.01); *H04J 14/0221* (2013.01); *H04J 14/0267* (2013.01); *H04J 14/0227* (2013.01); *H04J 14/0284* (2013.01); *H04J 14/0268* (2013.01)

USPC .......................................... 398/57

(58) Field of Classification Search
CPC ................. H04Q 11/005; H04Q 2011/0011; H04J 14/0257; H04J 14/0269
USPC ................................ 398/57, 175
See application file for complete search history.

(56) References Cited

U.S. PATENT DOCUMENTS 6,654,379 B1 * 11/2003 Grover et al. ............... 370/406
2002/0063915 A1    5/2002 Levandovky et al.

FOREIGN PATENT DOCUMENTS

WO    01/18999 A1    3/2001

OTHER PUBLICATIONS

S. Kim et al., "Regenerator Placement Algorithms for Connection Establishment in All-Optical Networks", IEE Proc-Commun., vol. 148, No. 1, Feb. 2001.*
Banerjee et al, "A practical approach for routing and wavelength assignment in large wavelength-routed optical networks", IEEE Journal of Selected Areas in Communications 14 (5), Jun. 1996.
Jukan et al, "Service-specific resource allocation in WDM networks with quality constraints", IEEE Journal of Selected Areas in Communications 18 (10), Oct. 2000.

(Continued)

*Primary Examiner* — Shi K Li
(74) *Attorney, Agent, or Firm* — Capitol Patent & Trademark Law Firm, PLLC

(57) ABSTRACT

The method of placing regenerators along a trail connecting a source network node with a destination network node of an automatically switched optical network first identifies N tentative regeneration sites and n+1 optical paths along the trail. Wavelengths are assigned to each optical path, and the performance of the trail is assessed based on regenerator placement data and wavelength assignment data.

6 Claims, 7 Drawing Sheets

(56) References Cited

OTHER PUBLICATIONS

Ramaswami et al, "Design of logical topologies for wavelength-routed optical networks", IEEE Journal of Selected Areas in Communications 14 (5), Jun. 1996.

Zhang et al, "A heuristic wavelength assignment algorithm for multihop WDM networks with wavelength routing and wavelength re-use", IEEE/ACM Transactions on Networking 3 (3), Jun. 1995.

G. Lehr et al, "Management o All-Optical WDM Networks: First Results of European Research Project MOON", NOMS '98. IEEE Network Operations and Management Symposium, vol. 3 Conf. 10, Feb. 15, 1998, pp. 870-879, XP000793435.

Nada Golmie et al, "A Differentiated Optical Services Model for WDM Networks", IEEE Communications Magazine, vol. 38, No. 2, Feb. 2000, pp. 68-73, XP000912316.

Nasir Ghani et al, "On IP-over-WDM Integration", IEEE Communications Magazine, vol. 38, No. 3, Mar. 2000, pp. 72-84, XP011091247.

Wolfgang Mader et al, "Results of the PHOTON and MOON Field Trials", OFC/IOOC '99. Optical Fiber Communication Conference/International Conference on Integrated Optics and Optical Fiber Communication, Feb. 21, 1999, pp. 234-236, XP000967039.

\* cited by examiner

REGENERATORS PLACEMENT MECHANISM FOR WAVELENGTH SWITCHED OPTICAL NETWORKS

PRIORITY PATENT APPLICATION

This patent application is a continuation of U.S. patent application Ser. No. 10/097,901 entitled "Regenerators Placement Mechanism For Wavelength Switched Optical Networks" filed on Mar. 13, 2002, (the " '901 Application") which is a continuation-in-part of U.S. patent application Ser. No. 09/909,264 entitled "Wavelength Routing and Switching Mechanism For a Photonic Transport Network", Smith et al., filed Jul. 19, 2001 (the " '264 Application") wherein the disclosures of the '901 Application and '264 Application are hereby incorporated by reference in their entireties herein as if they had been set forth in full herein.

RELATED US PATENT APPLICATIONS

U.S. patent application "Architecture For A Photonic Transport Network", (Roorda et al.), Ser. No. 09/876,391, filed Jun. 7, 2001, assigned to Innovance Networks.

U.S. patent application "Wavelengths assignment in an optical WDM network", (Solheim et al.), Ser. No. 10/017,833, filed Dec. 12, 2001).

FIELD OF THE INVENTION

The invention is directed to a telecommunication network, and in particular to a system and method for placing regenerators along a route of a wavelength switched optical network.

BACKGROUND OF THE INVENTION

The most relevant trends in the optical networking area are the increase in the network capacity and the increase in transmission reach. A higher network capacity is obtained by increasing the channel rate, known as TDM (time division multiplexing), and/or by increasing the channel density, known as WDM (wavelength division multiplexing).

Advances in transmitter and receiver design, evolution of optical amplification, employment of distributed Raman amplification combined with various dispersion compensation techniques, new encoding and modulation techniques, digital wrapper technology, etc., enabled the installation of ultra-long reach networks, where regeneration of the signal is effected at 3,000 km or more.

However, current WDM networks use point-to-point connectivity, which means that all channels are OEO (optical-to-electrical-to-optical) converted at each node. In addition, the pt-pt network requires duplication of equipment for protection/restoration in case of fault. As a result, the configuration of a typical node of a point-to-point network is very complex. On the other hand, OEO conversion at all intermediate nodes is not necessary in the majority of cases, since the modern ULR techniques allow optical signals to travel distances greater than the distance between two or more successive nodes without regeneration. Thus, important cost savings may be obtained by eliminating the unnecessary OEO conversion equipment.

There is a need to reduce the cost of the network nodes by maximizing the distance traveled by the signals in optical format, to take advantage of the emerging ULR techniques and to provide a more efficient use of the network equipment.

Furthermore, scaling-up or/and providing new services in a point-to-point network requires very complex network engineering and planning involving extensive simulation and testing. Currently, the waiting time for a new optical service in point-point networks is over 120 days.

There is a need to break the wavelength engineering bottleneck currently constraining the engineering-to-provisioning ratio, and for wavelengths to became available as a network resource automatically deployable across the network. There is also a need to minimize the number of wavelengths that are deployed while avoiding the color clash effect for optical signals having different wavelengths and sharing a single fiber, for efficient use of all network resources.

SUMMARY OF THE INVENTION

It is an object of the invention to provide an agile network with a regenerator placement method that switches a regenerator into a trail only when necessary for conditioning the signal.

It is also an object of the invention to optimize regenerator placement and wavelength assignment for efficient use of regenerators and wavelengths available in the network, while maintaining a very efficient time-to-service.

Accordingly, the invention provides, a method of placing regenerators along a trail connecting a source network node with a destination network node in an automatically switched optical network, comprises: (a) identifying N tentative regeneration sites S(i) along the trail, and N+1 optical paths, an optical path OP(i+1) between a tentative regeneration site S(i) and a next tentative regeneration site S(i+1); (b) selecting a path wavelength for each the optical path; and (c) determining a performance parameter of the trail based on regenerator placement data obtained at (a) and wavelength assignment data obtained at (b).

The invention provides according to a further aspect a method of establishing a connection between a source node and destination node of an automatically switched optical network in response to a connection request, comprising: (a) engineering a regenerator path between the source and destination nodes, based on current network configuration and performance and on constraints in the request; and (b) attempting to establish the connection along the regenerator path According to a still further aspect, the invention is directed to a method of establishing a connection between a source node and destination node of an automatically switched optical network in response to a connection request, comprising: engineering a plurality of regenerator paths between the source and destination nodes, based on current network configuration and performance and on constraints in the request; and selecting a best path from the plurality of regenerator paths to serve the connection.

Advantageously, the regenerator placement method according to the invention allows fast, automatic establishment of new connections based on the current network architecture, connectivity and loading and also on conditions in the connection request. Selection of regenerator sites and of the wavelengths used on each regenerator segment is performed with optimal use of current network resources, while ensuring that the quality of the selected trail is adequate for the respective call. The method provides for both distance and performance balancing, and it optimizes the network response time.

BRIEF DESCRIPTION OF THE DRAWINGS

The foregoing and other objects, features and advantages of the invention will be apparent from the following more particular description of the preferred embodiments, as illustrated in the appended drawings, where.

DESCRIPTION OF THE PREFERRED EMBODIMENTS

Figure 1:
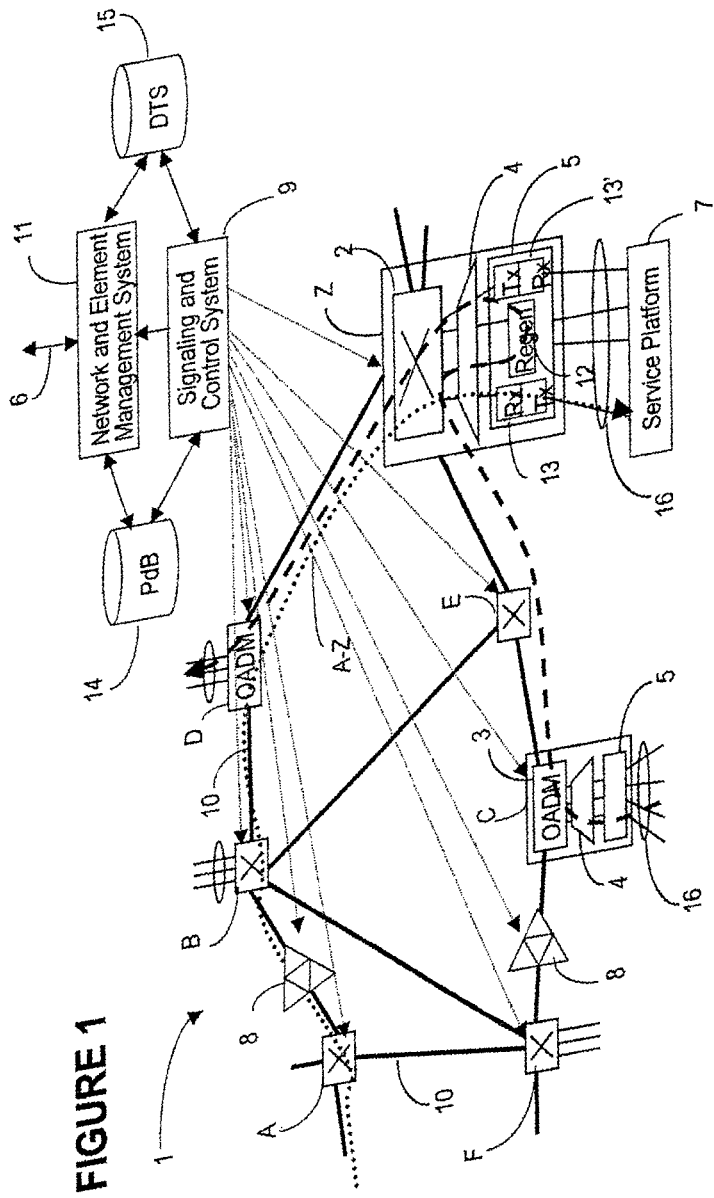
FIG. 1 shows an example of a photonic network to which the present invention is applicable.

An example of a wavelength switched optical network (or automatically switched network, or agile network) is shown in FIG. 1. The DWDM layer of network 1 is mesh-connected with wavelength switching nodes (also called flexibility points or flexibility sites) instead of traditional pt-pt nodes. Connections are set-up and removed on request with optimal use of optical-to-electrical-to-optical (OEO) conversion. The architecture and operation of this network is described in the above-referenced co-pending patent application Ser. No. 09/876,391, which is incorporated herein by reference.

To summarize, network 1 comprises bidirectional fiber links 10 connecting a plurality of nodes, which are nodes A, B, C, D, E, F, Z in the example of FIG. 1. These nodes may be switching nodes A, B, E, F, Z, or OADM (optical add/drop multiplexing) nodes C, D. Local traffic 16 originating and terminating on a service platform 7 (a router, an ATM switch, an EXC, etc.) accesses the network 1 at a switching node or an OADM node.

Network 1 may be partitioned into the following building blocks.

a) Electro-optics 5 performs on/off ramp of client signals onto/from the optical network and interfaces into the access multiplexing and switching systems of the network. System 5 includes a pool of transponders (TR), and a pool of wavelength converters/regenerators 12. Transponders 13, 13', are interfaces between the network and the service platform 7. Regenerators 12 provide OEO-based wavelength conversion and/or regeneration in the network core. Also, the transmitters for both the transponders and regenerators are tunable, allowing for flexibility in selecting an optimal end-to-end trail and assigning wavelength(s) to that trail.

b) Wavelength switches (or wavelength cross-connects WXC) 2 and optical add/drop multiplexers 3 provide optical passthru, (bypassing OEO conversions), and optical add/drop of the local traffic from/to the electro-optics 5.

c) Access multiplexing/demultiplexing and switching subsystem 4 routes the add and drop channels between the electro-optics sub-system 5 and the respective switch 2, or OADM 3. It distributes individual wavelengths from the line system to the transponders/regenerators, and aggregates individual wavelengths from the transponders/regenerators onto the line system.

d) Optical line subsystem post/pre amplification and line amplifier subsystem 8 is provided on links 10 between the nodes. It comprises post, pre and line amplifiers and the associated dispersion and power management equipment necessary for ultra-long haul propagation along the line.

A signaling and control system (SCS) 9 is provided between all nodes and the optical line subsystem. SCS 9 allows topology discovery, fault monitoring and photonic layer network management. As resources are added to the network, system 9 updates a distributed topology system DTS 15 with the new resources, their location and connectivity, their operating parameters, etc. Measured and specified data for the optical devices and the fiber links of network 1 are also provided as shown by performance database 14. Based on this topology and performance information, a network and element management system (NEMS) 11 monitors and controls the operation of the network nodes and their connectivity, and provides network inventory data and various metrics.

A user may establish/remove a connection across the network over interface 6.

The following definitions are used throughout this specification:

"Dial", "Redial", "Call" or "connection request" refers to a request for exchanging traffic between two nodes. It includes conditions such as the source and destination nodes, traffic bandwidth and rate, the class of service CoS, the type of routing, explicit constraints, etc.

A "link" refers to the fiber and equipment between two consecutive flexibility sites, such as 10 in FIG. 1.

A "connection" is a logical route from a source node, generically referred to as node A to a destination node, generically referred to as node Z. A "route" or "trail" refers to a specific route for the A-Z connection. Thus, connection A-Z can be routed as shown in FIG. 1 along route ABDZ, which originates at switching node A, passes through nodes B and D in optical format, and is dropped at node Z to service platform 7. Connection A-Z can also be established along route AFCEZ.

A "regeneration site" is a node that OEO converts the traffic on the route passing through that node. Network 1 has the ability to determine if a connection needs regeneration, looks for a regenerator 12 available at one or more flexibility sites along the route and allocates regenerator(s) to the respective route to correctly deliver the signal to its destination. A regenerator may also convert a wavelength to avoid wavelength collision or blocking on the next segment. Thus, node Z on route CEZD shown in FIG. 1 is such a regeneration site.

An "optical path" or "regenerator segment" refers to the fiber and the equipment between a transmitter and the next receiver. Thus, CZ and ZD are two regenerator segments on route CEZD.

A "regenerator path" refers to an end-to-end route where the regeneration sites are specified. There may be a plurality of regenerator paths for a route that has intermediate nodes, since regenerators may be placed at one, some or all nodes of the respective route. For example, a regenerator path for route CEZD is C-Z-D having a regenerator placed at intermediate node Z as in FIG. 1. Another regenerator path for route CEZD is C-E-D, having a regenerator placed at intermediate node E.

The term "conditions" refer to a class of service (CoS), a type of routing, explicit constraints, source and destination nodes, traffic bandwidth and rate, etc. Examples of classes of service are 0:2 (separate working and protection/restoration routes), 0:1(no protection), 0:1 with reserved redial. Examples of types of routing, or "constraints" are node disjoint, node disjoint best effort, link disjoint link disjoint best effort, SRLG (Shared Risk Link Group) disjoint, or SRLG disjoint best effort. The term "explicit constraints" refers for example to link/node inclusions/exclusions, etc. Other explicit constraints may be e.g. the cost limit for a route, specified regeneration sites.

"Network topology information" includes information on network equipment and connectivity, fiber type for each link, wavelengths availability per link, link loading, the number and type of transponders and regenerators at each node and their availability, etc.

"Network performance information" includes various measurements obtained throughout the network, such as for example link dispersion measurements, wavelength performance/reach for each link, optical amplifier power and noise figure, etc.

Figure 2:
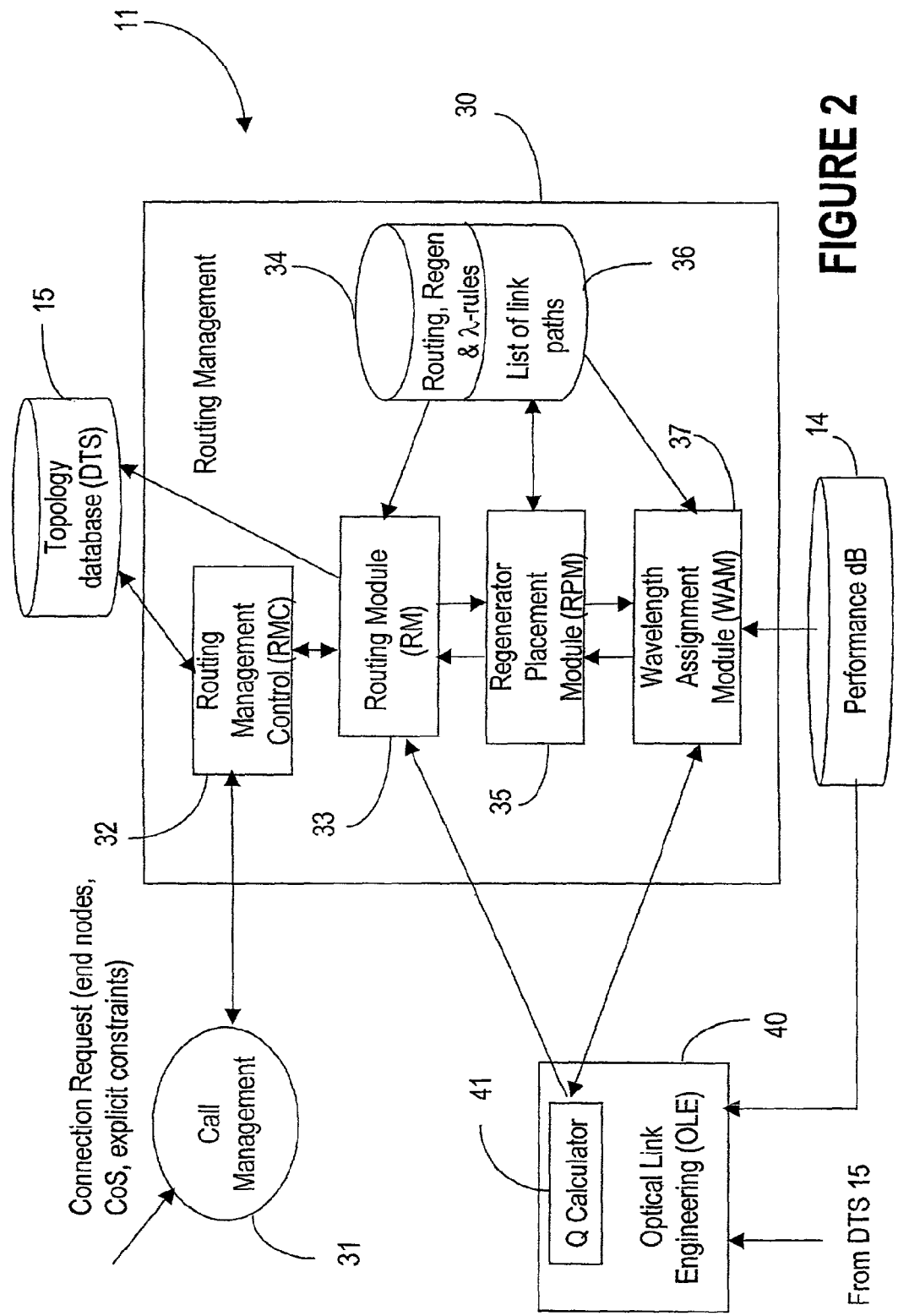
FIG. 2 shows the main modules involved in the routing and switching services within the network of FIG. 1 and their interaction.

FIG. 2 is a logical overview of the modules of NEMS (network and element management system) 11 pertinent to the invention. A detailed description on how the routing and switching mechanism of FIG. 2 operates is provided in Ser. No. 09/909,265. A brief description follows.

A routing management platform 30 comprises a routing module (RM) 33, a regenerator placement module (RPM) 35 and a wavelength assignment module (WAM) 37, operated by a routing management control (RMC) 32. After receiving a connection request from a call management block 31, RMC 32 operates modules RM 33, RPM 35 and WAM 37 to generate a list 36 of best possible routes, based on the current network topology information, on the performance of the route and on the conditions imposed by the respective connection request. The current topology is available form the distributed topology system DTS 15, while the performance information is retrieved from the performance database 14. The RMC 32 orders the routes in list 36 according to e.g. cost and their chances of successful set-up and supplies the routes one by one to the call management block 31. It is to be noted that the term "list" refers to the information identifying the respective paths, and not to the particular software data structure called "list". It could be also referred to as "a table" or "a record". Block 31 attempts to setup the connection, and if the first route on the list fails, block 31 tries next route, and so on. The list of routes 36 is maintained until the A-Z connection is successfully established. The time for setting up a connection may be further reduced by using different setup strategies, as described later.

While a large number of trails may be available for an A-Z connection, routing module RM 33 selects only a specified number 'k' of trails in the first instance. RM 33 may use one or more routing methods, such as Breath First Search (BFS), Ford-Fulkerson Augmenting Path (FAP), and/or the routing cycle method, to find a number of end-to-end paths for the respective request.

Regenerator placement module (RPM) 35 attempts to uncover a specified number 'm' of sets of regenerator paths for each of the 'k' routes. A set comprises all regenerator paths with the same number of regenerators, n=[0, 1, ..., N], placed at different nodes. For example, a $1^{st}$ set includes the routes (if any) with no regenerators (n=0), a $2^{nd}$ set includes the routes that have one regenerator (n=1) placed at a certain different node along that link path, and so on. The maximum number N of regenerators that can be placed on a trail is limited by the number of intermediate nodes.

The WAM 37 is responsible with assigning wavelengths to each regenerator segment, based on wavelength rules 34, wavelength availability from DTS 15, and on information about wavelength performance, obtained from the performance database 14. Thus, the routing process resolves wavelength contention in order to reduce lambda blocking; considers lambda-reach characteristics; and assigns wavelengths with appropriate reach profiles for each optical path of the respective route. Since the route performance cannot be estimated until after the wavelength assignment module (WAM) 36 assigns wavelengths to each path, operation of RPM 35 is described in relation with operation of WAM 37.

Modules 33, 35 and 37 operate according to rules 34. For example, 'k' and 'm' may be selected by the user, based preferably on e.g. the route cost, expected performance, the required setup time. Also, RPM 35 selects the regeneration sites based on overall network regenerator availability and current connectivity map, while WAM 37 assigns the wavelengths to the regenerator section in such a way as to reduce wavelength fragmentation. Other rules may be included in rules 34.

The path performance is evaluated using an optical link engineering module 40. Routing management platform 30, and particularly the regenerator placement module 35 and wavelength assignment module 37 use a Q-calculator 41 during trail selection and ordering operations. The Q calculator 41 is designed with a view to provide a more accurate "wavelength and regenerator" to optical path fit. This in turn helps to minimize the cost of the path and the overall network cost.

Q factor (or simply Q) is a measure of the signal quality, being inversely related to BER (bit error rate). The value of Q encapsulates the resulting effects of optical phenomena impacting on the propagation of signals through equipment. Q approximates the amount of distortion to a propagated signal due to effects such as cross-talk between wavelengths, chromatic dispersion, etc. and estimates the quality of the optical signal on various path segments. Once Q falls under a threshold, signal regeneration is required. Estimating Q is not an easy task especially in dense WDM (wavelength division multiplexed) networks, as it depends on a large set of parameters, and also has a complex dependence on manufacturer component variability. As an example, the sensitivity of Q to component variability is so great that the actual maximum reach for a regenerator will vary from 2,000 to 4,000 km if the average reach is 3,000 km.

A path is of an acceptable quality and is placed in list 36 if:

$$Q_{calc} > Q_{th} \qquad \text{EQ1}$$

where $Q_{calc}$ is estimated by Q calculator 41 using the wave propagation formula and wave propagation tables. It also takes into consideration the link topology, the current loading and the loading after the new wavelength is added, optical component variability, and other factors. $Q_{th}$ is the threshold at which the signal is unacceptable. The value may, for example, be set at 4.1 dB.

Figure 3A:
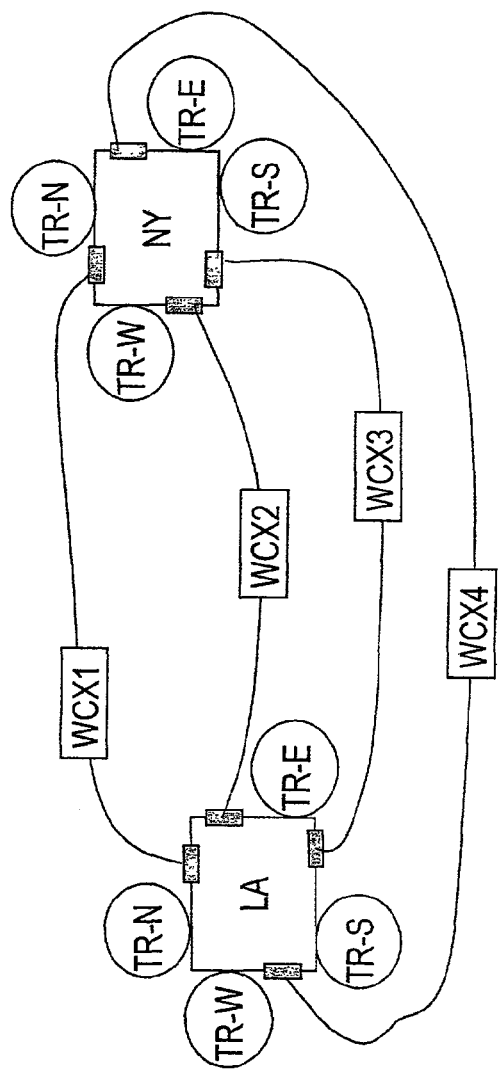
FIG. 3A shows selection of a trail with pre and post provisioned end points.

Selection of the end transponders may be pre-provisioned, when for example the end transmitter has a certain type and comes from a certain pool of transponders at the source node. The selection may also be post-provisioned, where there is no constraint on the end transponders. FIG. 3A shows an example of a connection from a Los Angeles node LA to a New York node NY. We assume that nodes LA and NY have four access directions (east E, west W, north N and south S), and thus four access groups 4 with the respective electro-optics 5 as shown in FIG. 1, each with a pool of transponders/regenerators namely TR-E, TR-W, TR-N and TR-S.

The route selection is constrained at the beginning and the end of the path in the case when the end transponders are pre-provisioned. If the source transponder at LA is from the TR-W pool and the destination transponder at NY is in TR-E pool, then routing is constrained to use the westbound group at LA and hence is not able to make any free routing decisions until the node denoted with WXC4 (wavelength cross-connect). Also, since the destination transceiver at NY is pre-provisioned to come from TR-E pool, routing must ensure that the path enters NY on the east side. Therefore, in the pre-provisioned case the path is LA (TR-W)-WXC4-NY (TR-E).

In the case where the end transponders are post provisioned (floating case), routing is not constrained at either the beginning or end of the path, so that RPM 35 is free to make the decision as to which transceiver pools to use. Hence, in the floating case one potential route is LA (TR-E)-WXC2-NY (TR-W). In this case however, a specification of an access group at an end point is required. The access group may contain transponders from a number of different directional transponder pools.

Figure 3B:
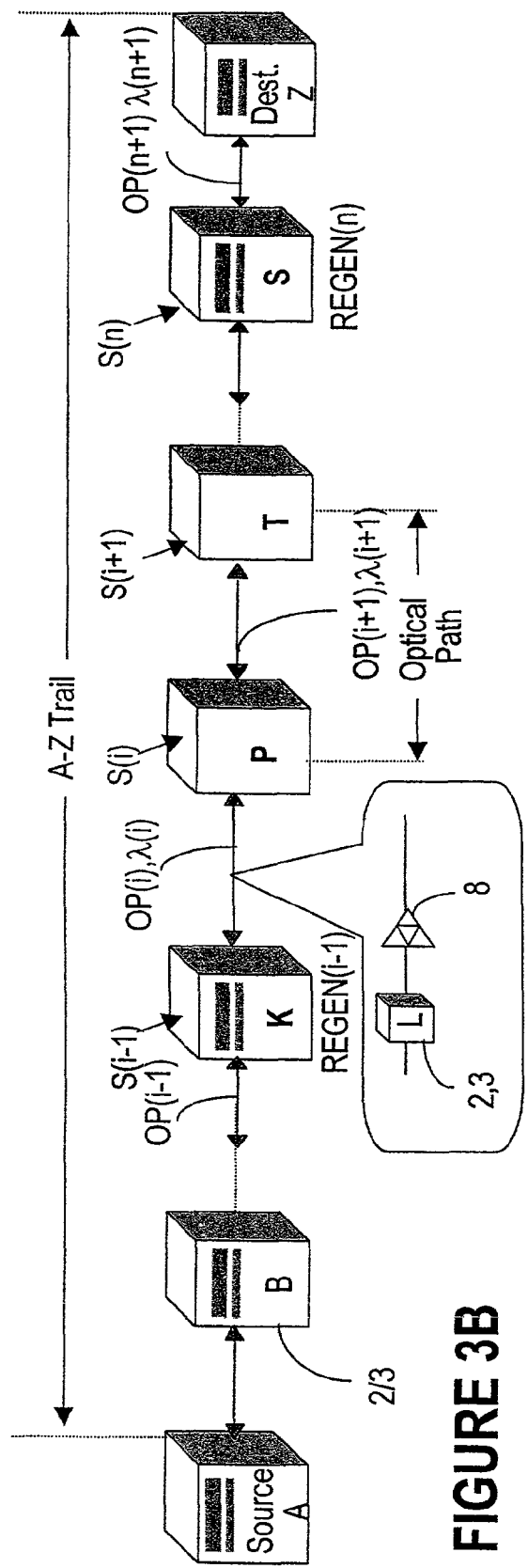
FIG. 3B illustrates an example of a route (trail) with a plurality of flexibility sites and regeneration sites.

FIG. 3B shows a route (trail) A-Z with a plurality of flexibility sites A, B, ... K, L, ... P, ... T, ... S, ... Z, where nodes A and Z are the source and destination node, respectively, and nodes K, P, T and S are regeneration sites (i.e. nodes equipped with regenerators). The regeneration sites are designated using S(i), and the respective regenerator is designated as REGEN(i), where i is an integer between 1 and n, where n is the total number of regenerators along route A-Z. It also shows an optical path OP(i) between two successive regenerating sites S(i−1) and S(i). The insert illustrates that an optical path OP(i) comprises optical devices such as optical amplifiers and also may include flexibility sites, such as node L, that are passed by an A-Z signal in optical format (without OEO conversion and regeneration).

Figure 4:
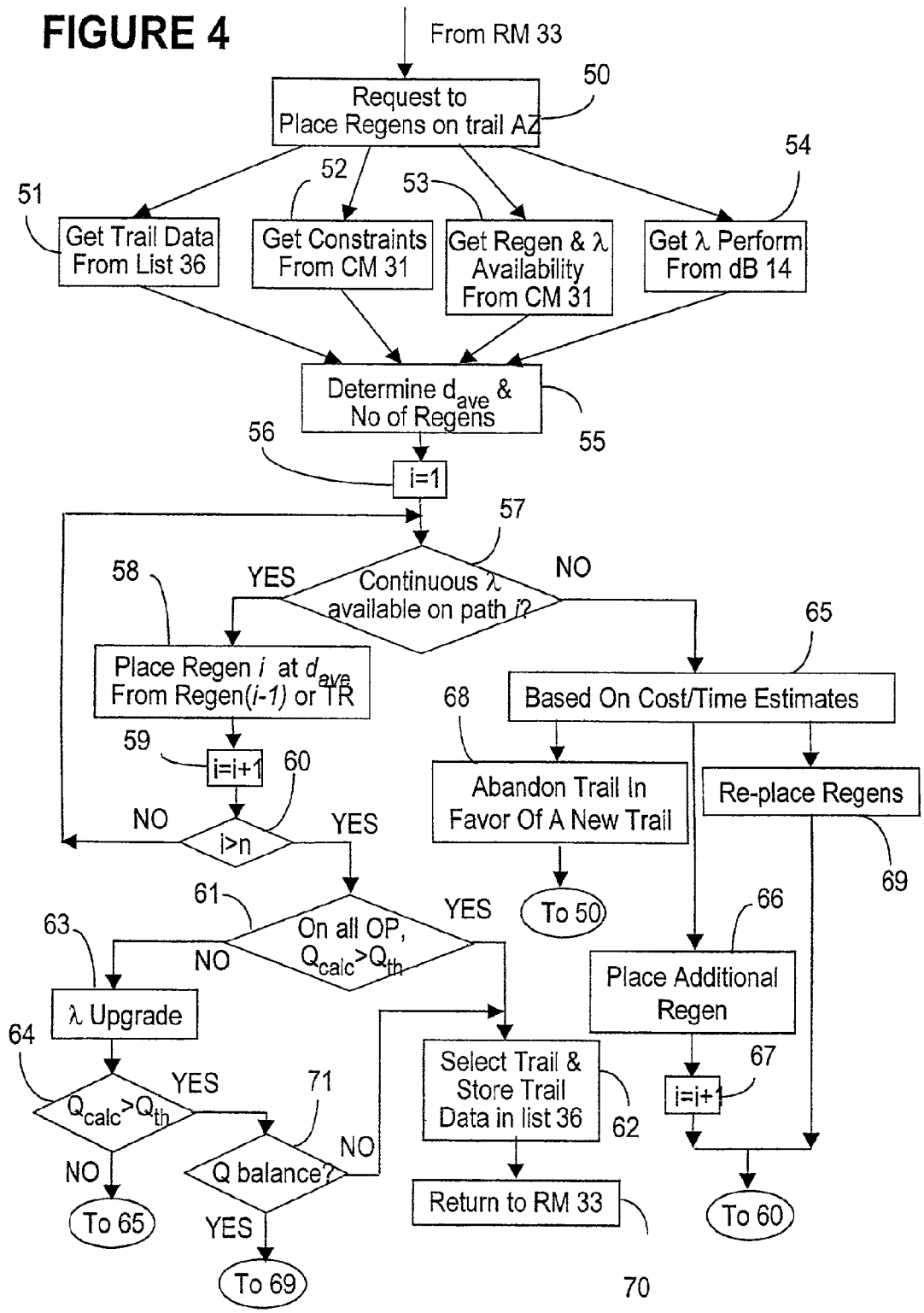
FIG. 4 is a flow chart illustrating the method of placing regenerators along a route according to an embodiment of the invention.

FIG. 4 is a flowchart showing the operation of the RPM 35, which is explained in connection with FIGS. 5-9. At step 50, regenerator placement module 35 receives from routing module 33 a request to place regenerators in a specified trail, which is path A-G in the example of FIG. 5. RPM 35 retrieves the trail data from list 36, step 51, and the constraints from the call management 31, step 52. RPM 35 also accesses database 15 to get information about the type and availability of transponders and regenerators at each node of the A-G route, and about wavelength availability on each optical path of route A-G, step 53. Furthermore, wavelength performance data is obtained from database 14, step 54.

Figure 5:
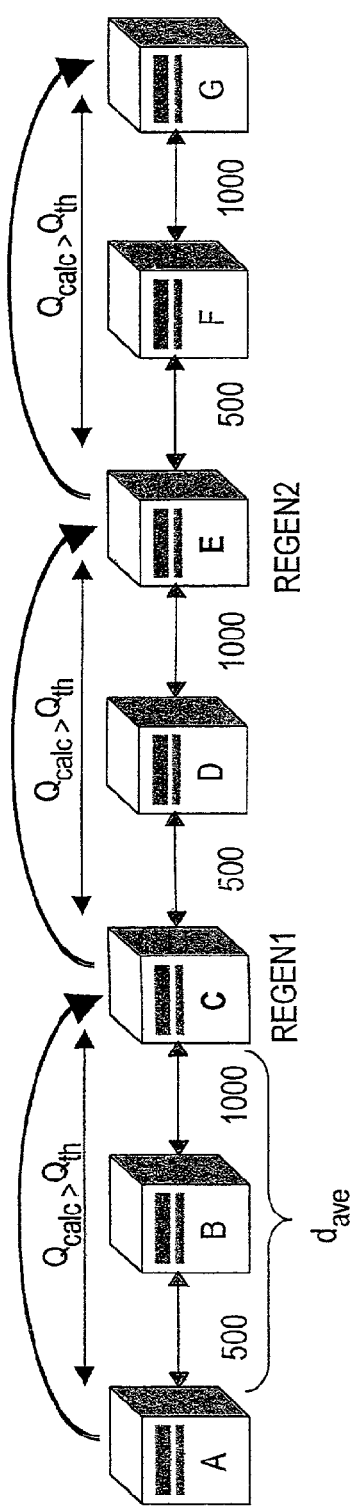
FIG. 5 illustrates regenerator placement using the average distance.

In step 55, an average distance $d_{ave}$ is determined, to indicate where the regenerators could be placed. Let's assume that, as shown in FIG. 5 the distance between nodes A and G is 4,500 km, and the maximum reach of a wavelength is 2,000 km. This means that $d_{ave}$ is 1,500 km and at least two regenerators are needed (n=2) for connecting nodes A and G, defining three (n+1) regenerator segments of 1,500 km each.

Placement of the first regenerator (i=1) begins at step 56. RPM 35 invokes the WAM 37 which determines if a continuous wavelength is available on the first regenerator segment between nodes A and C, as shown in step 57. If a continuous wavelength is available, branch YES of decision block 57, then the first regenerator REGEN1 is placed at node C, step 58. Node C is referred to as a "tentative regeneration site" being a node selected for an initial regenerator placement. This placement may change, as seen later in connection with e.g. FIG. 6b. Also, the term "placing" refers to logically placing the regenerator at a certain tentative regeneration site.

The concrete (physical) placement of regenerators on the trail takes place when the path is lit.

Placement of REGEN2 is performed in a similar manner by checking if there is a continuous wavelength available on segment CE, which can reach node E from node C, as shown by steps 59, 60, 57, 58. These steps are repeated until i=N, which means that all regenerators were placed as shown by branch YES of decision block 60. In the example of FIG. 5 regenerator placement is complete after REGEN2 has been placed at node E. The regeneration sites are placed at nodes C and E and the regenerator segments are AC, CE and EG. It is to be noted that the regeneration sites are selected at nodes closest to the average distance; in this example the nodes are exactly at $d_{ave}$.

Next, RPM 35 validates the placement in step 61, by checking if the trail performance is satisfactory, i.e. if $Q_{calc}$ is greater than $Q_{th}$. As discussed above, $Q_{calc}$ is estimated for each regenerator segment by invoking the Q calculator 41. If all regenerator segments have an acceptable performance, the route is selected, step 62. This means that the route data is completed in list 36 with information about the nodes where specified regenerators could be placed and with information about the wavelengths assigned to each segment. Path and route performance parameters are also stored against the respective regenerator path. The operation is thereafter returned to RM 33, step 70.

If, on the other hand, WAM 35 could not find a continuous wavelength on a certain segment calculated according to $d_{ave}$, as shown by branch NO of decision block 57, RPM 35 re-places the regenerators along the path, while maintaining the number n of regenerators, step 69, or places an additional regenerator, as shown by step 66. "Re-placing" refers to revising the initial placement for addressing a reach, wavelength blocking or performance problem, as shown for example in FIG. 6b. After the regenerators were re-placed, or an additional regenerator was placed in a problem-segment, the RPM continues operation as before, by attempting to place the next regenerator, as shown by steps 67 and 60. The decision to use one or both corrective actions 66, 69 takes into consideration the cost of the trail and the time needed for such measures, as shown at 65.

If the above corrective actions result in unacceptable cost/time values, the current trail is abandoned, step 68, and a new trail is requested from RM 33.

Figure 6:
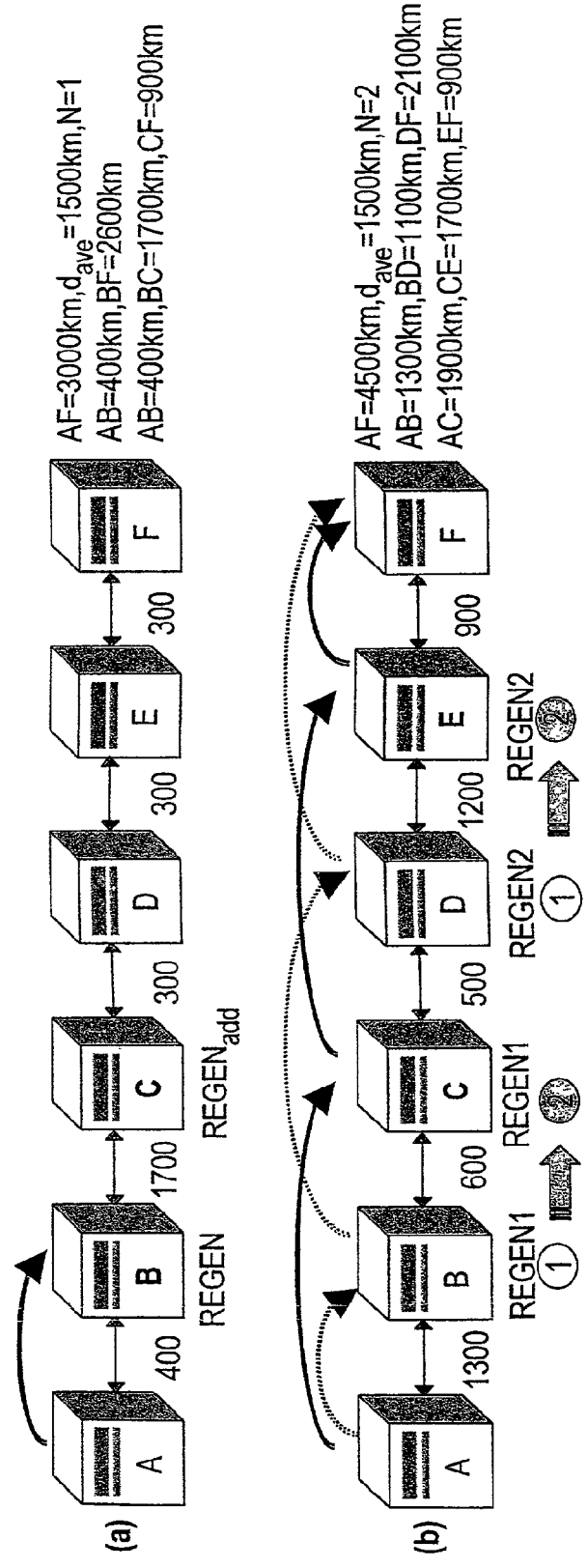
FIGS. 6a and 6b illustrate placement of regenerators for addressing reach estimate problems: (a) by using an additional regenerator and (b) by re-placing the regenerators along the trail.
Figure 7:
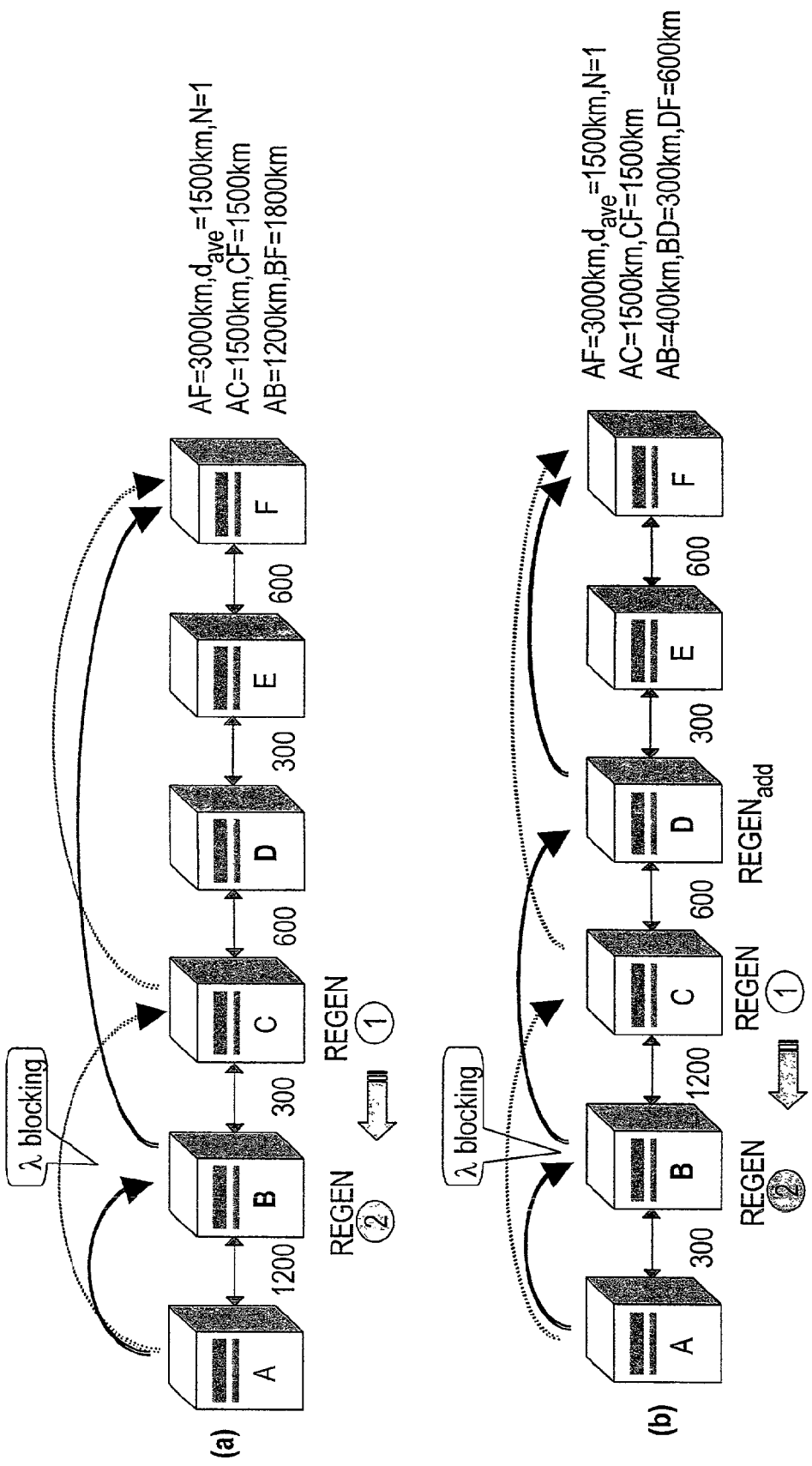
FIGS. 7a and 7b illustrate placement of regenerators for addressing wavelength blocking problems: (a) by re-placing the regenerators along the trail, and (b) by using an additional regenerator.
Figure 8:
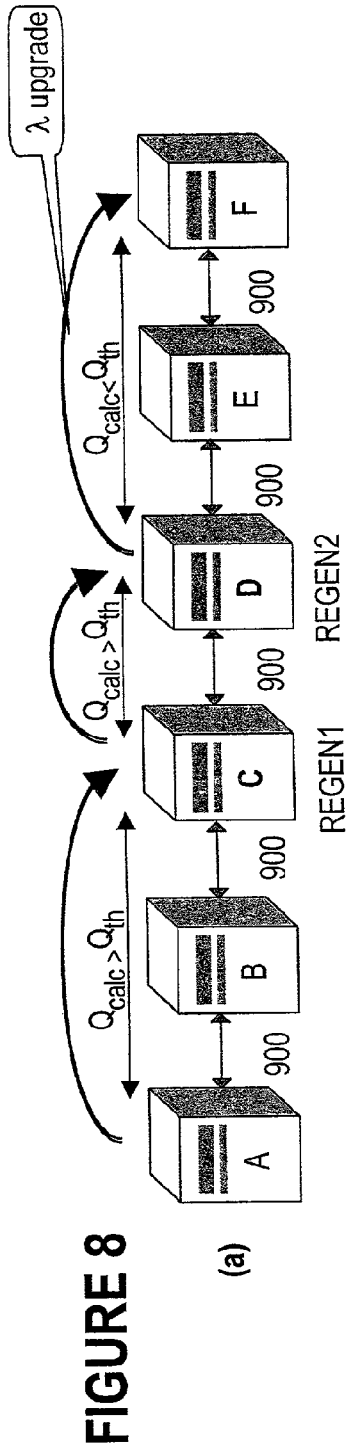
FIGS. 8a and 8b illustrate how path performance problems are addressed: (a) using a wavelength upgrade and (b) using regenerators re-placement.

In FIGS. 6-8, the first row of the legend provides the route information pertinent to regenerator placement for the respective example, the second row pertains to the initial (tentative) regenerator placement and the third row provides the actual regenerator placement. Also, the identification of a node where a regenerator has been placed is illustrated in bold. FIG. 6a shows a route with a reach estimation problem, resolved as shown by step 66 in FIG. 4. The AF route in this example has 3,000 km, resulting in a $d_{ave}$ of 1,500 km, which means that n=1. The reach of all wavelengths in this example is assumed again to be 2,000 km. According to the average distance placement rule, since the distance AC is 2,100 km (greater than the wavelength reach), the regenerator REGEN is placed at node B. The distance BF in this case is 2,600 km, which is again greater than the wavelength reach of 2,000 km, so that the wavelength originating at node B cannot reach node F. In this case, an additional regenerator $REGEN_{add}$ must be placed on segment BF, for example at node C. Now, segment AB is 400 km, BC is 1,700 km and CF is 900 km, and the route AF has good chances of successful setup.

FIG. 6b shows how an initial regenerator placement may be adjusted as shown in step 69 of FIG. 4, to solve a reach estimation problem. In this example the length of the trail is 4,500 km, $d_{ave}$ is 1,500 km, and n=2. Initially, as illustrated in dotted lines, the first regenerator REGEN1 is placed at node B, at 1,300 km from node A, which distance is closer to $d_{ave}$ than the distance of 1,900 km to node C. If the second regenerator REGEN2 is placed according to the average distance rule, it should be placed at node D, which is at 1,100 km from node B. However, due to a reach problem, the second regenerator REGEN2 cannot be placed at nodes D, since such a placement will result in the third regenerator segment being longer than the wavelength reach of 2,000 km. By changing the placement of REGEN1 one hop further towards the destination, i.e. at node C, as illustrates in continuous lines, REGEN2 may be placed at node E, resulting in segments AC=1,900 km, CE=1,700 km and EF=900 km. Now, path AF has good chances for successful setup. Node B is also referred as a problem node.

FIG. 7a shows a path with a wavelength blocking problem, solved as shown at step 69 in FIG. 4 by re-placing the regenerators downstream from the problem node. In this example, the length of the trail is 3,000 km, $d_{ave}$ is 1,500 km and n=1. Let's assume that wavelength blocking occurs at node B. In this case, even though the average distance $d_{ave}$ would allow placement of a regenerator at node C, the regenerator REGEN must be placed at node B for wavelength conversion. Since the length of segment BF is 1,800 km, node F can still be reached from node B.

In the example of FIG. 7b, the distances are such that by placing REGEN at node B where the blocking occurs, node F cannot be reached. In this case, an additional regenerator $REGEN_{add}$ is placed at one on nodes C, D or E, preferably D, as shown by step 66 in FIG. 4.

Returning now to FIG. 4, some options are available to correct a low performance problem on one or more regenerator segments, as shown along branch NO of decision block 61. FIG. 8a illustrates a route AF with an under-performing optical path. In this example, the length of the route is 4,500 km, $d_{ave}$ is 1,500 km and n=2. REGEN1 and REGEN2 are initially placed at nodes C and D. In this configuration, while $Q_{calc}$ is acceptable for segments AC and CD, it is not so for the last segment DF. To address this performance problem, RPM 35 preferably requests WAM 36 to assign a "better" wavelength to the third segment, i.e. a wavelength that can reach node F, which is also termed a wavelength upgrade, as shown in step 63. Patent application Ser. No. 10/017,833 identified above describes how the wavelengths can be matched to connections according to their performance; this patent application is incorporated herein by reference. It is also possible to engineer the first wavelength selected for the segment DF to get a longer reach (for example by increasing the gain of the optical amplifiers on the respective segment, etc), as also described in the patent application Ser. No. 10/017,833. These solutions are less expensive than adding a regenerator, and they also can be less time consuming than re-placing the regenerators.

After the wavelength upgrade, RPM 35 checks again if $Q_{calc} > Q_{th}$, as shown at step 64, and selects the path in the case when the performance is satisfactory, branch YES of decision block 64. If not, one of the above discussed corrections 66, 69 may be tried. Such an example is shown on FIG. 8b. The dotted arrows show the initial placement of regenerators at nodes C and D; the regenerators are re-placed as shown in continuous-line arrows, in an attempt to solve a path quality problem. Since $Q_{calc} < Q_{th}$ on the last segment, REGEN2 is moved from node D to node E. While the change does not result in a reach problem in this example, it will enhance the performance of the third segment, so that the resulting regenerator path may provide an acceptable performance and may thus be selected.

It is to be noted that it is arbitrary whether a wavelength upgrade is performed before a regenerator replacement as shown in flow-chart of FIG. 4, or vice-versa. In addition, it is possible to perform a second, etc. wavelength upgrade(s), if the first upgrade failed.

It is also possible in this case to abandon this link path in favor of an alternate, cheaper route, step 68, if the Q criterion is still not met after regenerator re-placement.

As well, if after a successful regenerator placement operation, the Q for a segment of the respective regenerator path is barely higher than $Q_{th}$ in step 61, and all other segments have a very good Q, RPM 35 may still try to re-place the regenerators to balance the Q along the entire path, as shown by step 71 in FIG. 4.

In addition, Q calculator 41 may be provided with the ability to calculate two versions of Q, namely a $Q_{quick}$ and $Q_{complete}$, where $Q_{quick}$ takes into account fewer data points when calculating cross-phase modulation (XPM) than $Q_{complete}$. XPM is a phenomenon whereby co-propagating optical signals that are of similar frequencies degrade each other's performance. The closer in frequency they are, the more the degradation. The reason for using these two versions is that $Q_{complete}$ is computationally intensive and as such, takes a longer time to be determined (15 ms-2 s longer than $Q_{quick}$), while the difference in the accuracy is 15%. Therefore, in order to reduce the path setup time, $Q_{quick}$ may be used in step 61 to find a viable regenerator path, and this path may be checked using $Q_{complete}$. Checking the route with complete can be performed for example only on fully loaded segments, where Q is heavily influenced by XPM.

The regenerator placement method of FIG. 4 provides the steps for placing n regenerators on a trail. In order to find regenerator paths with a higher number of regenerators (up to N) for completing list 36, the same steps are repeated until the total number of variants for all routes are uncovered. It is evident that the computation time depends on the number of optical paths in the solution. As the number of optical paths increases with the number of regenerators, the first solutions, which use fewer regenerators, will be quicker to compute than the later solutions, whilst the probability that they get used is much higher. There are some options to limiting the time-to-service.

1. For example, instead of calculating 'k' routes and then 'm' sets of 'n' regenerator paths for each routes, a single route is calculated and returned in response to a call. In the majority of cases, the first route and first regenerator scenarios will be satisfactory at setup. Another route may be calculated if all regenerator paths available for this first route cannot be set-up.

2. Another solution is to pass the regenerator paths back to the call management 31 for setup once they are calculated, without waiting to have all regenerator paths ordered in list 36. In this case, the time-to-service can be importantly reduced, especially for the worst case scenarios (e.g. for calls with a 0:2 CoS, with significant wavelength blocking). For example, let's assume that RM 30 calculated a first regenerator path and a first upgraded variant of this route. These routes are returned to call management 31 and are tried one after the other, while RM 30 calculates a second regenerator path and a respective upgrade, which is made available for a set-up attempt after/if the previously tried regenerator path fails. As soon as a route set-up succeeds, the calculations for the next regenerator path cease. It should be noted that the navigation through the matrix of FIG. 6A of the parent patent application Ser. No. 09/909,265 is dropped in this scenario.

As seen above, the WAM 37 preferably assigns mid-reaching wavelengths to medium-sized hops ($d_{ave}$). On the other hand, the WAM 37 must ensure that the full spectrum is being made use of. This can be accomplished by selecting the wavelength not only based on availability and average reach, but also on actual reach, wavelength spacing, and fragmentation.

Thus, WAM 37 may consider for a certain segment a certain number of wavelengths of various reaches. When the next regenerator is placed and the actual length of the segment becomes available, WAM 37 will assign to that segment an available wavelength by matching the wavelength reach with the length of the segment. There are a number of approaches on how to optimize selection of wavelengths.

One approach is provided in the parent patent application Ser. No. 09/909,265, which gives an example of a table where the wavelengths are grouped (groups G also called bins, or search sets) based on their performance. A generalized version of such a table is given below, using the notations from FIG. 3B.

| Reach Range/Ordered Seach Set | 1-250 km Range 1 | ... | 1-500 km Range (j − 1) | 501-750 km Range (j) | ... (j + 1) ... | 4251-4500 km Range (M) |
|---|---|---|---|---|---|---|
| 1$^{st}$ Search Set | λ_Set(1,1) | | | λ_Set(1,j) | | λ_Set(1,M) |
| 2$^{nd}$ Search Set | λ_Set(2,1) | | | λ_Set(2,j) | | λ_Set(2,M) |
| 3$^{rd}$ Search Set | λ_Set(3,1) | | | λ_Set(3,j) | | λ_Set(3,M) |

The columns correspond to the reach ranges, and the rows correspond to search sets, which can also correspond e.g. to the load in the respective fiber. For example, the 1$^{st}$ search set may correspond to a 0-25% wavelength fill, and the 2$^{nd}$ and 3$^{rd}$ search sets may correspond to a 26-50% and a 51-100% wavelength fill, respectively. The set denoted by λ_Set(2,j) also includes λ_Set(1,j) and λ_Set(3,j) includes λ_Set(2,j), for all j values (i.e. for all columns). The number and size of the bins is variable; the entry in each bin is the set of wavelengths that can be used for the corresponding reach and load combination. The load ranges effectively correspond to the wavelength spacing, so as to allow placing the wavelengths uniformly in terms of frequency spacing.

It is to be noted that this table is provided by way of example and other ways of arranging wavelength performance data can be envisaged within the scope of this invention.

An alternative wavelength binning is described next using an example. It may be advantageous in some cases to order the sequence in which the optical signals are setup. As before, the bin comprises all wavelengths that are predicted to reach a certain distance for a given type of fiber. Let's assume that we consider a bin which includes wavelengths λ1-λ10 and λ91-λ100, having a maximum reach of 1,000 km over TrueWave© fiber. Let's also assume that it is best to initially set up λ1, λ5, λ9, λ91, λ95 and λ99, and then λ3, λ7, λ93 and λ97, and then finally all remaining wavelengths in the bin. This can be achieved by ordering the wavelengths in the bin in the sequence λ1, λ5, λ9, λ91, λ95, λ99, λ3, λ7, λ93, λ97, λ2, λ4, λ6, λ8, λ10, λ92, λ94, λ96, λ98, λ100, and then using the wavelengths from λ1 towards λ100 in the bin as the wavelengths are required.

One difference between these two approaches is that the first approach suggests that the search be started in the table with the bin that corresponds to the current load in the fiber as available in the DTS 15. The second approach suggests starting the search in the first search set regardless of the current load in the fiber. The advantage of the first approach is that it does better in terms of minimization of wavelength fragmentation, while the second approach does better in terms of wavelength spacing in the selection of a wavelength.

Figure 9:
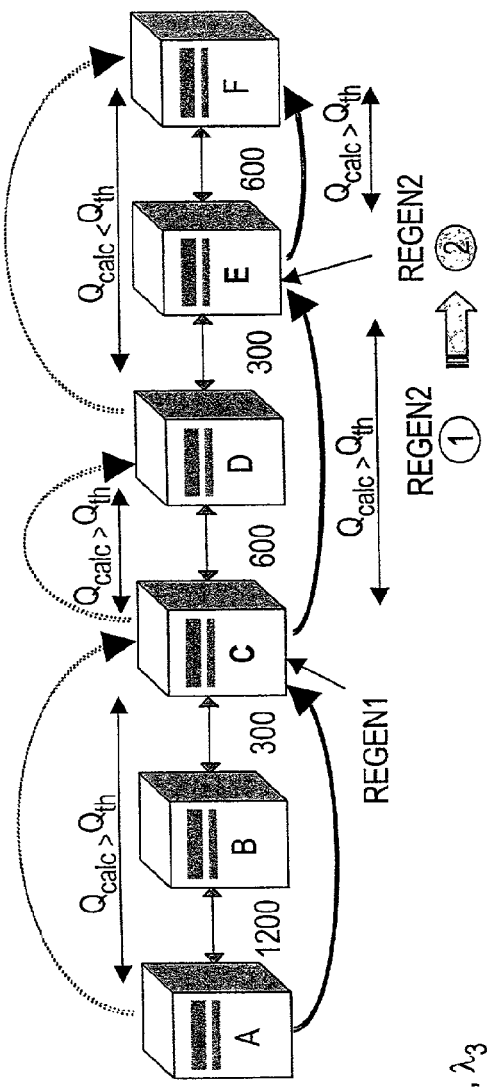
FIG. 9 illustrates how wavelength fragmentation may be reduced.
Figure 9:
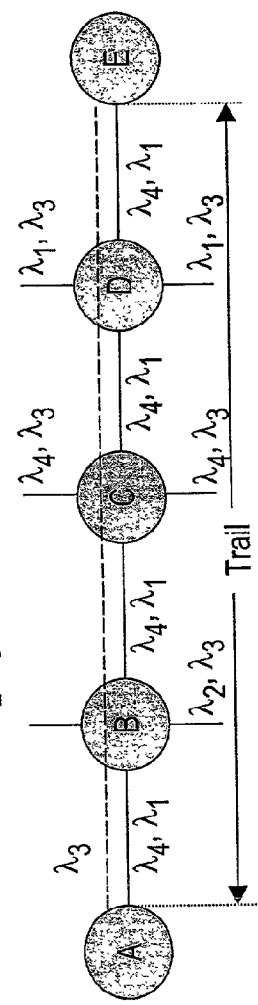

It is preferable to minimize wavelength fragmentation across the optical path, in order to minimize blocking of wavelengths and also to reduce the use of regenerators. This means that the wavelength assigned to a certain path will be one that is most frequently used at all flexibility points in the path. FIG. 9 shows an example of an optical link between end nodes A and E, the intermediate nodes B, C and D, and all wavelengths that are already used at all nodes A-E on crosslinks. It is apparent that λ3 is used most often on the crosslinks. Let's assume that λ3 is available on path A-E. Hence, assigning λ3 for this optical path is best, because it minimizes fragmentation of other wavelengths, since λ3 is already the most fragmented wavelength at the nodes along the path under consideration.

We claim:

1. A method of establishing a connection between a source node and destination node of an automatically switched optical network in response to a connection request from a user, comprising:

(a) engineering a regenerator path between said source and destination nodes including a first route and a wavelength-upgraded variant of the first route, based on current network configuration, network performance and on constraints in said request from the user; and (b) attempting to establish said connection along said first route of the regenerator path, wherein upon failure of the first route, connection is attempted along said wavelength-upgraded variant of said first route.

2. The method as claimed in claim 1, further comprising:

(c) during step (b) engineering a further regenerator path including a second route and a wavelength-upgraded variant of the second route between said source and destination nodes while attempting to establish a connection using previously-engineered paths; and (d) if step (b) fails, attempting to establish said connection along said further regenerator path.

3. The method as claimed in claim 2, further comprising (e) repeating steps (a) to (d) for a still further regenerator path until a connection is successfully established.

4. The method as in claim 1 wherein the resources comprise wavelengths and regenerators.

5. A method of establishing a connection between a source node and destination node of an automatically switched optical network in response to a connection request, comprising:

(a) modifying a transmission wavelength in a first route segment of a regenerator path between a source and destination node, including a wavelength-upgraded variant of the first route segment, based on current network configuration, network performance and constraints in a connection request; and (b) attempting to establish a connection between the source node and destination node along the first route segment, wherein upon failure of the first route segment, a connection is attempted along the wavelength-upgraded variant of the first route segment.

6. A network management hardware system for establishing a connection between a source node and destination node of an automatically switched optical network in response to a connection request, the system operable to:
  (a) modify a transmission wavelength in a first route segment of a regenerator path between a source and destination node, including a wavelength-upgraded variant of the first route segment, based on current network configuration, network performance and constraints in a connection request; and
  (b) attempt to establish a connection between the source node and destination node along the first route segment, wherein upon failure of the first route segment, the system is further operable to attempt a connection along the wavelength-upgraded variant of the first route segment.

* * * * *